V. DE DOMINICIS AND F. A. REIP.
AUTOMOBILE TRAFFIC SIGNAL.
APPLICATION FILED DEC. 20, 1919.
1,419,661.
Patented June 13, 1922.
2 SHEETS—SHEET 1
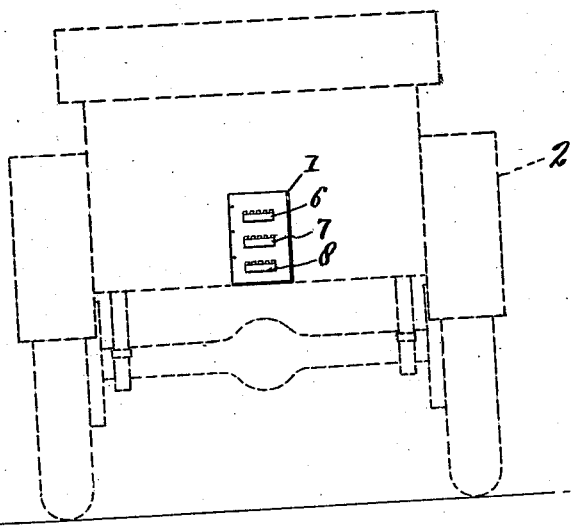
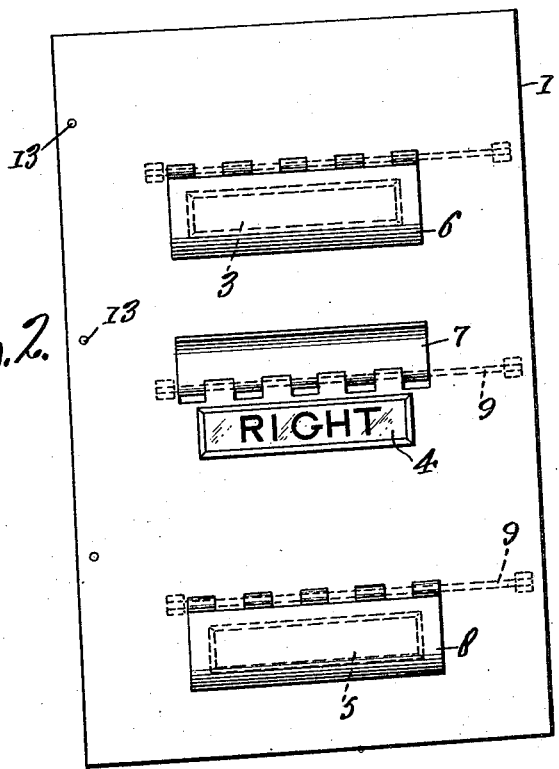
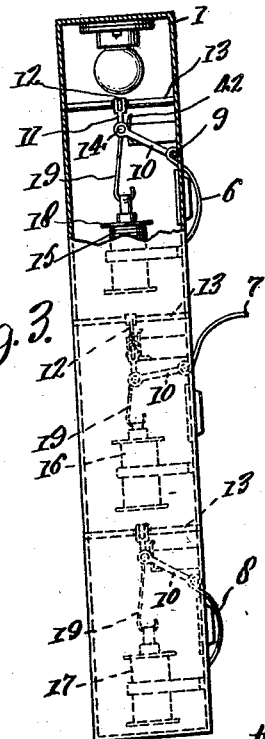
Inventors.
Vincent De Dominicis
and Frank A. Reip.
by Wilkinson & Giusta.
Attorneys.

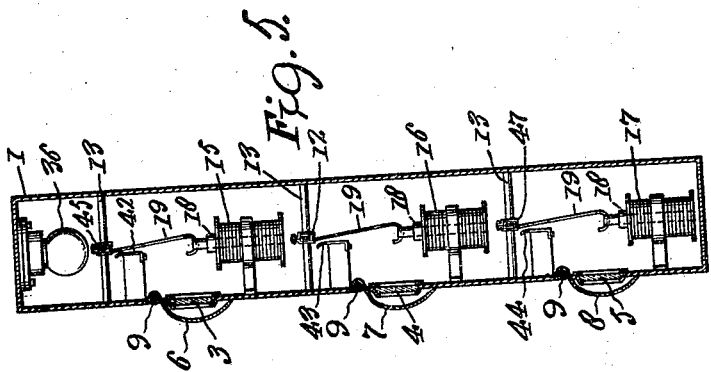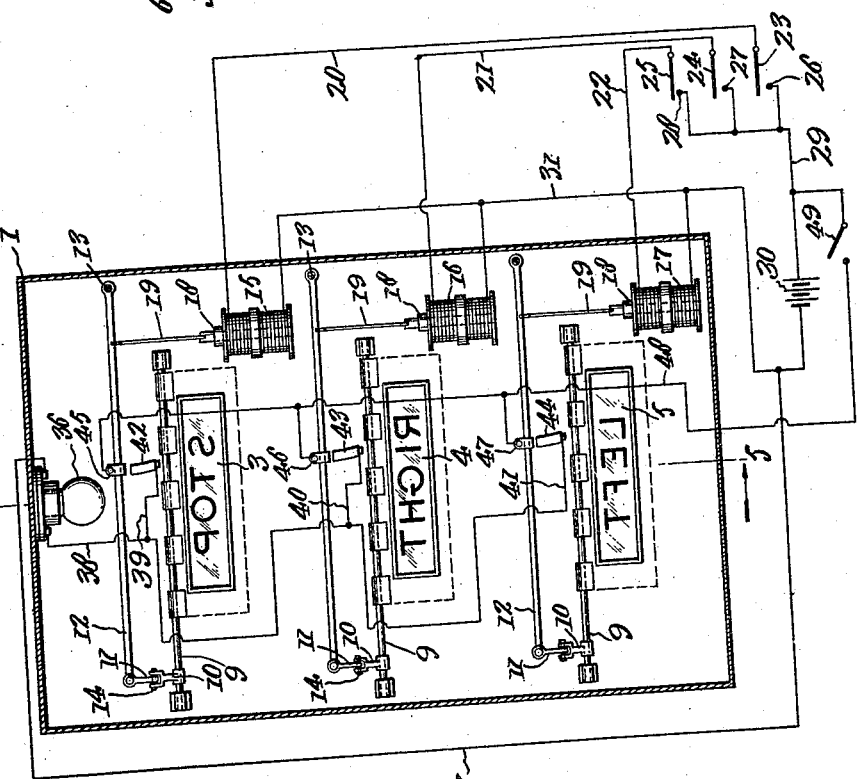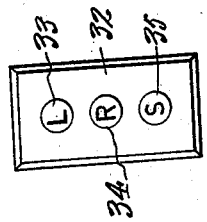

UNITED STATES PATENT OFFICE.

VINCENT DE DOMINICIS AND FRANK A. REIP, OF EAST ORANGE, NEW JERSEY.

AUTOMOBILE TRAFFIC SIGNAL.

1,419,661.

Specification of Letters Patent. Patented June 13, 1922.

Application filed December 20, 1919. Serial No. 346,339.

*To all whom it may concern:*

Be it known that we, VINCENT DE DOMINICIS and FRANK A. REIP, citizens of the United States, residing at East Orange, in the county of Essex and State of New Jersey, have invented certain new and useful Improvements in Automobile Traffic Signals; and we do hereby declare the following to be a full, clear, and exact description of the invention, such as will enable others skilled in the art to which it appertains to make and use the same.

The present invention relates to improvements in automobile traffic signals, and more particularly relates to that class of signals which has to do with the showing proposed stops or turns to the right or left, so that a vehicle carrying the signaling apparatus may apprise the drivers of following vehicles of proposed stops and changes in directions in order to avoid an oncoming vehicle colliding with a preceding vehicle.

The invention consists in the constructions, combinations and arrangements of parts hereinafter more fully described and pointed out in the claim.

In the accompanying drawings forming a part of this application, and in which similar reference symbols indicate corresponding parts in the several views:

Figure 1 shows in dotted lines a rear view of an automobile equipped with an improved signaling apparatus constructed in accordance with the present invention.

Figure 2 is a rear elevational view of the signal mechanism showing one of the signal covers lifted.

Figure 3 is a side elevational view of the signaling apparatus with parts shown in section.

Figure 4 is a vertical sectional view through the signaling apparatus.

Figure 5 is a vertical sectional view taken on the line 5—5 in Figure 4; and Figure 6 shows a plan of the switch panel.

The drawings show only one mechanical embodiment of which the invention is susceptible.

Referring more particularly to the drawings, 1 designates a casing adapted to be secured in any desired manner to an automobile or other vehicle in such a position that the signaling devices carried by the casing 1 may be observable by the drivers of oncoming vehicles in the rear. Figure 1 shows in dotted lines a rear elevational view of a motor vehicle, indicated at 2, and having the improved signaling apparatus 1 mounted at the rear thereof.

The casing 1 is provided with a number of openings in its rear wall in which are fitted glass or other panels 3, 4 and 5 bearing desired words such, for instance, as "Stop," "Right," and "Left." These signal panels 3, 4 and 5 are so produced that the signals thereon may be observable in daylight, and they are also preferably translucent so that they may be illuminated at night. The signal panels 3, 4 and 5 are normally obscured by covers 6, 7, and 8, respectively. These covers are arranged to be removed from the panels selectively by any suitable apparatus in order to reveal any particular signal.

In the embodiment shown in the drawings, each cover is secured to a rock shaft 9 so that the cover may be swung upwardly in the manner shown by the intermediate cover 7 in Figures 2 and 3. An arm 10 is carried by the rock shaft 9 within the casing 1 and is coupled to a second arm 11 projecting downwardly from a lever 12 which is fulcrumed at 13 to swing vertically in the casing 1. There is preferably a loose connection 14 between the arms 10 and 11 in order to take up the oscillating movement of the lever 12, and, as shown in Figure 4, this connection 14 may be made by the pin joint shown.

In like manner the covers 7 and 8 are mounted on similar rock shafts and are similarly connected to levers also designated by 12 in the casing 1, whereby such rock shafts 9 may be partially rotated to lift the respective covers and disclose the signal panels.

The three levers 12 shown are connected to solenoids 15, 16 and 17, each solenoid having a movable core or plunger 18 which is connected to the respective lever 12 by a rod or other connection 19.

The solenoids 15, 16 and 17 are respectively in circuits 20, 21 and 22 in electrical connection with the individual contacts 23, 24 and 25 of push button or other switches. The other contacts 26, 27 and 28 of the switches are all in connection by means of a conductor 29 with one side of the battery or other source of electricity 30. At 31 is indicated the common return wire connecting with the other side of the battery 30 and with the opposite ends of the solenoid coil 15, 16 and 17.

In Figure 6 is shown a switch panel 32 having three push buttons 33, 34 and 35, preferably having the letters "L", "R" and "S" indicating "Left", "Right" and "Stop" to correspond with the signal panels, and to indicate the operator which of the buttons is to be pressed in order to reveal any particular signal. The panel 32 with the push buttons is adapted to be placed on the steering wheel or instrument board of a motor vehicle, or it may be placed in any other desired position.

An electric lamp 36 is placed in the casing 1 to illuminate the signal panels at night, one side of the lamp being connected by a wire 37 to one side of the battery 30. The wire 38 connected with the opposite side of the lamp 36, is provided with three branches 39, 40, 41 which connect to contacts 42, 43 and 44 carried, respectively, by the three levers 12. The contacts 45, 46 and 47 are connected by a common wire 48 with the opposite side of the battery 30; a switch 49 being included in the lamp circuit in order that the lamp circuit may be kept open during daylight and only put into operation at night.

In use, the casing 1 carrying the various devices above described, is placed in the position shown in Figure 1 on the motor vehicle 2, or in any other desired position, where the signal panels may be observable by drivers of vehicles in the rear, and the switch panel 32 is arranged in a position for convenient operation by the driver of the motor vehicle.

Should it be proposed to make a stop, say, for instance, in obedience to a signal given by a traffic officer at a street intersection, the driver of the vehicle equipped with our invention will depress the push button 35, thus closing the contacts 23 and 26 shown in Figure 4, and completing the circuit 20, 31, through the solenoid 15. This energizing of the solenoid 15 causes the core 18 to be drawn downwardly which, through the connection 19, causes the lever 12 to be swung downwardly about its pivotal point 13. The downward swinging of the lever 12 is accompanied by a partial rotation of the rock shaft 9 by reason of the arms 10 and 11 which connect the lever and rock shaft, and viewed from the position shown in Figure 3, the rock shaft 9 will be turned in a counterclockwise direction, thus swinging the lid or cover 6 upwardly and showing the signal panel 3 with the word "Stop" thereon.

In case the operation just described is effected during daylight, the electric lamp switch 49 will be in the open position shown in Figure 4, and consequently when the lever 12 brings the two contacts 42 and 45 together the lamp 36 will not be lighted; whereas if the switch 49 is closed for use at night, the two contacts 42 and 45 will complete the circuit through the lamp 36 and cause the illumination of the "Stop" panel 3.

In like manner, when a proposed turn to the right is to be made, for instance at a street intersection, the push button 34 is depressed, causing the contacts 24 and 27 to be engaged and the circuit 21 closed through the intermediate solenoid 16, thus raising the cover 7 as shown in Figures 2 and 3 and disclosing the signal panel 4.

In a similar manner the left switch button 33 may be depressed to reveal the switch panel 5, indicating to those in the rear of the panel that such vehicle is about to make a turn toward the left.

It is obvious that those skilled in the art may vary the details of construction and arrangements of parts without departing from the spirit of our invention, and therefore we do not wish to be limited to such features except as may be required by the claim.

We claim:

A signalling device for vehicles comprising a casing having a display opening, a panel having signal indicia thereon disposed over the opening and being of translucent material, a rock shaft disposed within the casing and just above the opening and lying longitudinally of said opening, a cover secured at its upper longitudinal edge to the rock shaft within the casing and being curved outwardly to the exterior of the casing and adapted to lie in front of the opening to normally obscure the same, an arm on said rock shaft, a link connected to the free end of said arm and extending upwardly within the casing, a lever pivoted in the casing and disposed parallel with said rock shaft and substantially centrally of the casing, said lever having its free end coupled to said link, electro-magnetic means adapted to draw down said lever, illuminating means in the casing, and fixed and movable contacts adapted to control said illuminating means, said movable contact being carried by said lever, substantially as described.

VINCENT DE DOMINICIS.
FRANK A. REIP.